United States Patent [19]

Dreher

[11] Patent Number: 4,768,164
[45] Date of Patent: Aug. 30, 1988

[54] WORD PROCESSOR WITH FONT EXCHANGING FONT SYNTHESIZING MODE, AND SPACING MODE OF OPERATION

[75] Inventor: Geoffrey A. Dreher, Nashua, N.H.
[73] Assignee: Minolta Camera Kabushiki Kaisha, Osaka, Japan
[21] Appl. No.: 730,336
[22] Filed: May 3, 1985
[51] Int. Cl.[4] ............................. G06F 3/12; B41J 5/30
[52] U.S. Cl. ................................ 364/900; 364/519; 400/83; 400/109; 400/70
[58] Field of Search ... 364/200 MS File, 900 MS File, 364/519; 400/83, 70, 109, 110

[56] References Cited

U.S. PATENT DOCUMENTS

| | | | |
|---|---|---|---|
| 4,359,286 | 11/1982 | Barnes et al. | 400/109 X |
| 4,382,702 | 5/1983 | Fessel | 400/83 |
| 4,469,455 | 9/1984 | Makita | 400/82 X |
| 4,580,916 | 4/1986 | Rolfo et al. | 400/83 |

FOREIGN PATENT DOCUMENTS 2105503  3/1983  United Kingdom ............. 400/83

OTHER PUBLICATIONS

Czyszczewski et al., "Daisy Wheel Printer Expansion of Printwheel Character Set", IBM TDB, vol. 25, No. 4, Sep. 1982, p. 2165.

Primary Examiner—Raulfe B. Zache
Assistant Examiner—Thomas C. Lee
Attorney, Agent, or Firm—Price, Gess & Ubell

[57] ABSTRACT

A daisy wheel printing unit includes a wheel data memory housing wheel data such as kinds of characters provided in the daisy wheel by which it can be discriminated. The printing unit compares printing commands supplied to the printer and discriminates whether or not the characters to be printed included in the daisy wheel now being set in the printer. If it is discriminated that the characters to be printed are not included in the daisy wheel now being set in the printer, the user of the daisy wheel printing unit can select a desired printing mode from a plurality of printing modes including treatment for the above characters before the start of the printing operation of the document.

4 Claims, 13 Drawing Sheets

WORD PROCESSOR WITH FONT EXCHANGING FONT SYNTHESIZING MODE, AND SPACING MODE OF OPERATION

BACKGROUND OF THE INVENTION

1. Field of the Invention

The present invention relates to a word processor which is equipped with a printer using a replaceable printing font, such as an electronic typewriter employing a daisy wheel.

2. Description of the Prior Art

In recent years, in the field of a typewriter being adapted to print characters by means of impacts through mechanical control with a manual or electric mechanism, electronic typewriters have been brought into existence with the popularization of electronic parts, such as CPUs and memories, and also with the electronization of control systems. These electronic typewriters as mentioned above do not immediately provide printing commands input through a keyboard, but they are designed to print characters after loading the input document data on a memory, correcting any erroneous entries and arranging the document in a desired disposition.

For example, a daisy wheel printer is widely employed for high-quality printing because of its precise printing efficiency in comparison with at dot-impact printer or an ink-jet printer. The daisy wheel is a printing font disk which is disposed with characters or symbols at the respective end of a plurality of spokes provided on the circumferential periphery thereof and which is mounted onto a rotary shaft. For printing characters, the daisy wheel is rotated such that a character to be printed is moved to the printing position where the character should be printed.

On the other hand, word processors which are far superior to the aforementioned electronic typewriters in terms of memories and editing function have been developed through utilization of functions and systems of personal computers which have become low in price in accordance with the popularization of electronic parts. It is a general idea that word processors are designed to run such a software for word processors as represent by WORD STAR (Trademark owned by Micro Pro. Co. in the U.S.A.) on personal computers, and therefore being different from the electronic typewriters at the starting point. However, in the case where a daisy wheel printer is used as an output means in the word processor, the printing commands are not brought into printed characters directly after they are inputted through the keyboard, but the documents once inputted through the keyboard are first loaded on the memory and, then applied to print the characters after correcting erroneous typewritings or arranging the documents in a proper disposition being well balanced. Therefore, in view of the result so far achieved, the word processors may be classified in the same category as the above electronic typewriters. Although the following description is made mainly with respect to the word processors, it will be applied also to the electronic typewriters, and accordingly the description on the latter will be abbreviated hereinafter.

Problems to be Solved by the Invention

Printing fonts, such as daisy wheels, have, for physical reasons, a limited number of symbols that can be placed on the font.

Generally, the diameter of the daisy wheel is approximately 80 mm, and the number of spokes (characters) thereon is about 96–100 due to the structural limitation of a printing font. However, the number of characters employed in the electronic typewriter or the word processor is, for instance, in the embodiment of the present invention 62 of alphabetic and numeric characters (capital letters and small letters) and 46 of symbols such as a period, plus or minus, thus 108 in total plus the additional accented letters, for example Umlaute, etc. Therefore, all the characters (greater than 100 letters in the present embodiment) cannot be installed within one daisy wheel.

It can also be desirable to provide printing fonts with specialized symbols, e.g. for medical and scientific application and the use of accented letters, for example, in Europe, can place additional demands on the capacity of a printing font. Thus, at least two and possibly more printing fonts can be required on certain documents. It should be realized that these printing fonts can each duplicate the commonly used symbols and simply add the additional special symbols that would be characteristic of that printing font.

Thus, the problem of providing an efficient and professional looking printing system occurs when special symbols are required to be printed that cannot be all positioned on a single printing font.

SUMMARY OF THE INVENTION

Accordingly, the present invention has for its essential object to provide an improved printing system (i.e., word processor which is equipped with a daisy wheel printer as an output means, or electronic typewriter using a daisy wheel) which enables all the characters or symbols assigned for each key on the keyboard to be used despite the capacity limitations of the printing font.

Another object of the present invention is to provide an improved daisy wheel printing unit according to the present invention which enables the user, before the start of the printing operation, to select a desired printing mode from a plurality of printing modes, including treatment for the above characters.

In accomplishing these and other objects of the present invention, there is provided a daisy wheel printing unit including a keyboard for inputting characters to be printed therethrough, a document memory for memorizing the contents of a document inputted through the keyboard and a printer for printing the contents of the document memorized in the document memory by the use of a daisy wheel, wherein the number of characters which can be inputted through the keyboard is greater than the total number of printing characters allocated in one daisy wheel, the improvement thereof further comprising a wheel data memory which memorizes kinds of characters allocated in daisy wheels; a discriminating circuit which discriminates, with reference to the characters of the daisy wheels memorized by the wheel data memory, whether or not the characters to be printed can be printed by the use of the daisy wheel now being set in the printer; a first print control means which interrupts the printing operation until the set daisy wheel is exchanged with another daisy wheel containing the characters to be printed when the inability to print the characters to be printed is established by the discriminating circuit; a second print control circuit which synthesizes characters similar to the characters to be printed by the use of characters existing in the now-set daisy wheel when the inability to print the characters to be printed is established by the discriminating circuit; a third print control circuit which puts portrons of characters being unable to be printed by the now-set daisy wheel in blank when the inability to print the characters to be printed is established by the discriminating circuit, and a selection circuit for selecting one of the first, second and third print control circuit to be used in the printing operation.

Operations and Effects of the Invention

With the above, the daisy wheel printing unit according to the present invention is created to include a wheel data memory housing therein wheel data such as kinds of characters provided in daisy wheels and the like by which it can be discriminated, in comparison with printing commands supplied to the printer, whether or not the characters are included in the daisy wheel now being set in the printer. When it is discriminated in the above manner that the characters to be printed are not included in the daisy wheel now being set in the printer, the user of the daisy wheel printing unit can select one of the following three printing modes in accordance with the object and circumstances of the printing operation.

The first printing mode is such that all the characters to be printed are printed by regular characters through exchange of a daisy wheel or daisy wheels. According to this mode, the most beautiful printing form can be obtained with uniformity in the size and style of the characters. On the contrary, however, it is troublesome to exchange the daisy wheel whenever a character or characters which cannot be printed by the daisy wheel now being set in the printer are outputted. Therefore, the first printing mode is disadvantageous in that it takes more time to complete the printing operation, resulting from the necessity for the exchange of the daisy wheel, and moreover, the user should attend the printer all through the printing operation.

The second printing mode is such that either one of daisy wheels to be classified into two series are employed to use in operation and, when a character or characters which are not included in one of the two series of daisy wheels are to be printed, characters similar to the above characters to be printed are synthesized by utilizing other characters. For example, in the case of printing "§", a small "s" is printed first in the upper side of the printing position and then another small "s" is printed in the lower side of the printing position. According to this printing mode, although there remains a little unnatural appearance in the form of characters, it is advantageous in that the printing operation can be done without the necessity for the user to be present aside the printer, and therefore, the printing speed is faster than in the case of the first printing mode.

The third printing mode is employed in the case where a higher printing speed than in the second printing mode is required at the expense of a beautiful appearance of printing characters to some extend. In this case, when a character or characters which are not included in the daisy wheel now being set in the printer are to be printed, the characters tentatively remain as blanks or spaces without being printed.

As is made clear from the forgoing description, according to the present invention, advantages can be obtained such that all the characters which are able to be input through the keyboard can be printed, which cannot be done by the conventional word processors and electronic typewriters, and moreover, the user can select various printing modes in accordance with objects and circumstances for printing the characters.

BRIEF DESCRIPTION OF THE DRAWINGS

These and other objects and features of the present invention will become apparent from the following description taken in conjunction with one preferred embodiment thereof with reference to the accompanying drawings, in which.

DETAILED DESCRIPTION OF THE EMBODIMENTS

Figure 1A:
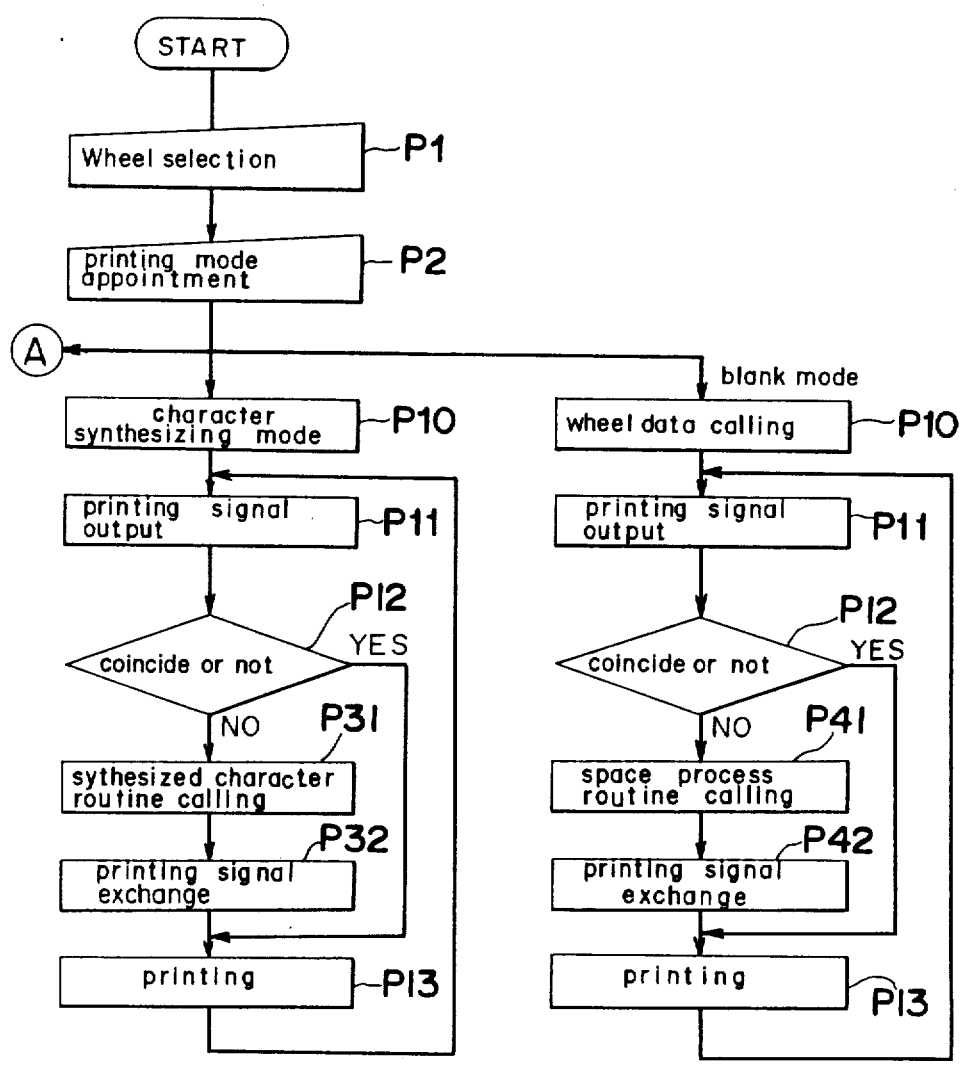
FIGS. 1(a) and 1(b) provide the flow charts showing the process of the printing operation.

Before the description of the present invention proceeds, it is to be noted that like parts are designated by like reference numerals throughout the accompanying drawings.

(a) Structure of the Word Processor

Figure 2:
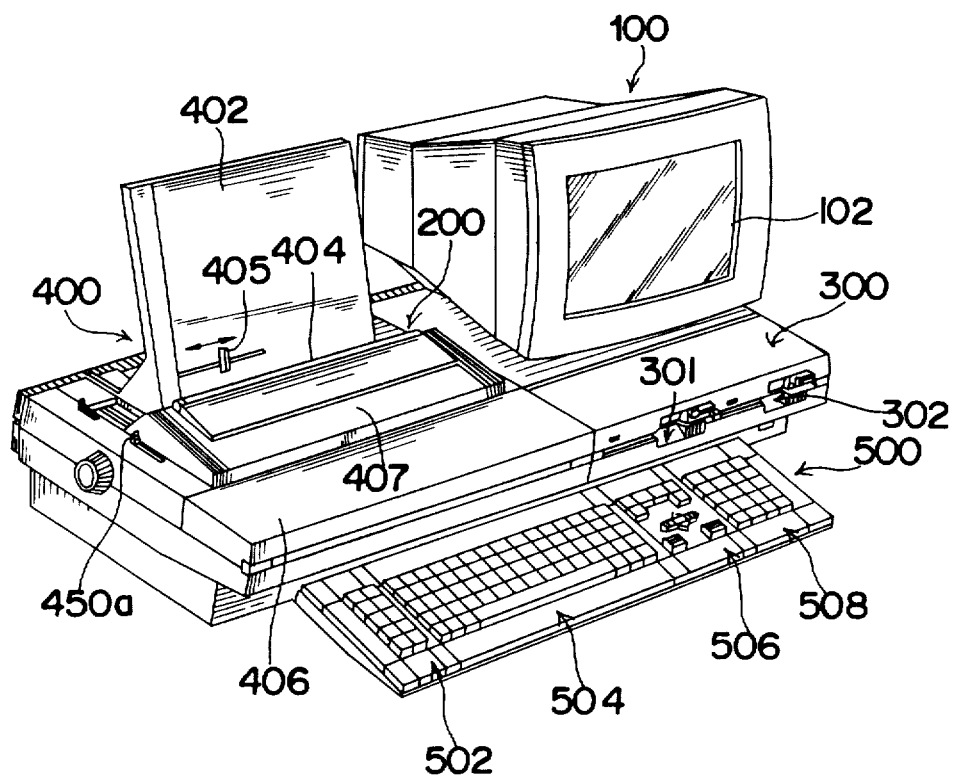
FIG. 2 is a perspective view of a word processor equipped with a daisy wheel printer.

Referring to FIG. 2, there is shown an external appearance of a word processor according to the embodiment of the present invention. The word processor is constituted by a keyboard 500 which is an external input circuit, a host computer 200 consisting of electronic parts such as a CPU, ROM and RAM and a power source, a storage device 300 equipped with floppy disk drivers 301 and 302 as an external memory, a display device 100, and a daisy wheel printer 400 which is an external output circuit.

Each of the above components will be described in more detail hereinbelow.

The storage device 300 is provided with a main switch (not shown) and the floppy disk drivers 301 and 302 as an external memory, both being manipulated directly by a user of the word processor.

Further, the display device 100 has a luminosity adjustment switch (not shown) and a CRT screen 102 displaying inputs from the keyboard 500, both being related directly to the operation of a user of the word processor.

On the operation panel of the keyboard 500 (FIG. 4), which is an external input means, are disposed character keys 510 for inputting characters such as alphanumeric ones in the same manner as a general typewriter does, function keys 520 being assigned with special commands in the state that the word processor is loaded with a program, cursor moving keys 530 for moving the word processor on the screen 102 of the CRT during the word processing operation on the employment of the software of the word processor, and calculational keys 540 for inputting numerals, etc.

The daisy wheel printer 400 has a paper guide 402, a position decision guide 405 which is used at the time of insertion of paper, a front cover 406, a silent cover 407 for prevention of sounds or noises, a visor 404 for prevention of reflection and a bail lever 405 which acts both as a switch for inserting the paper semi-automatically and as a platen for pressing the paper which is printing.

Next, the process for editing a text by the use of the word processor will be described hereinbelow.

In the state where, with the power supply being cut off, a system disk storing a program for the word processor is installed into the floppy disk driver 301 and also a data disk memorizing the contents of the prepared text is installed into the floppy disk driver 302, the storage device 300 is switched on. Then, the host computer accommodated in the storage device 300 goes to read the contents of the system disk inserted in the floppy disk driver 301. After the contents of the program for the word processor memorized in the system disk is loaded, the screen 102 of the CRT on the display device 100 displays blank portions on which the printer 400 can print by a frame 104, and also, a cursor 103 at the left side on the first line to be printed. In this state, upon pressing a character key 510 on the keyboard 500, the inputted character is displayed on the position indicated by the cursor 103.

(b) Structure of the Host Computer

Figure 3:
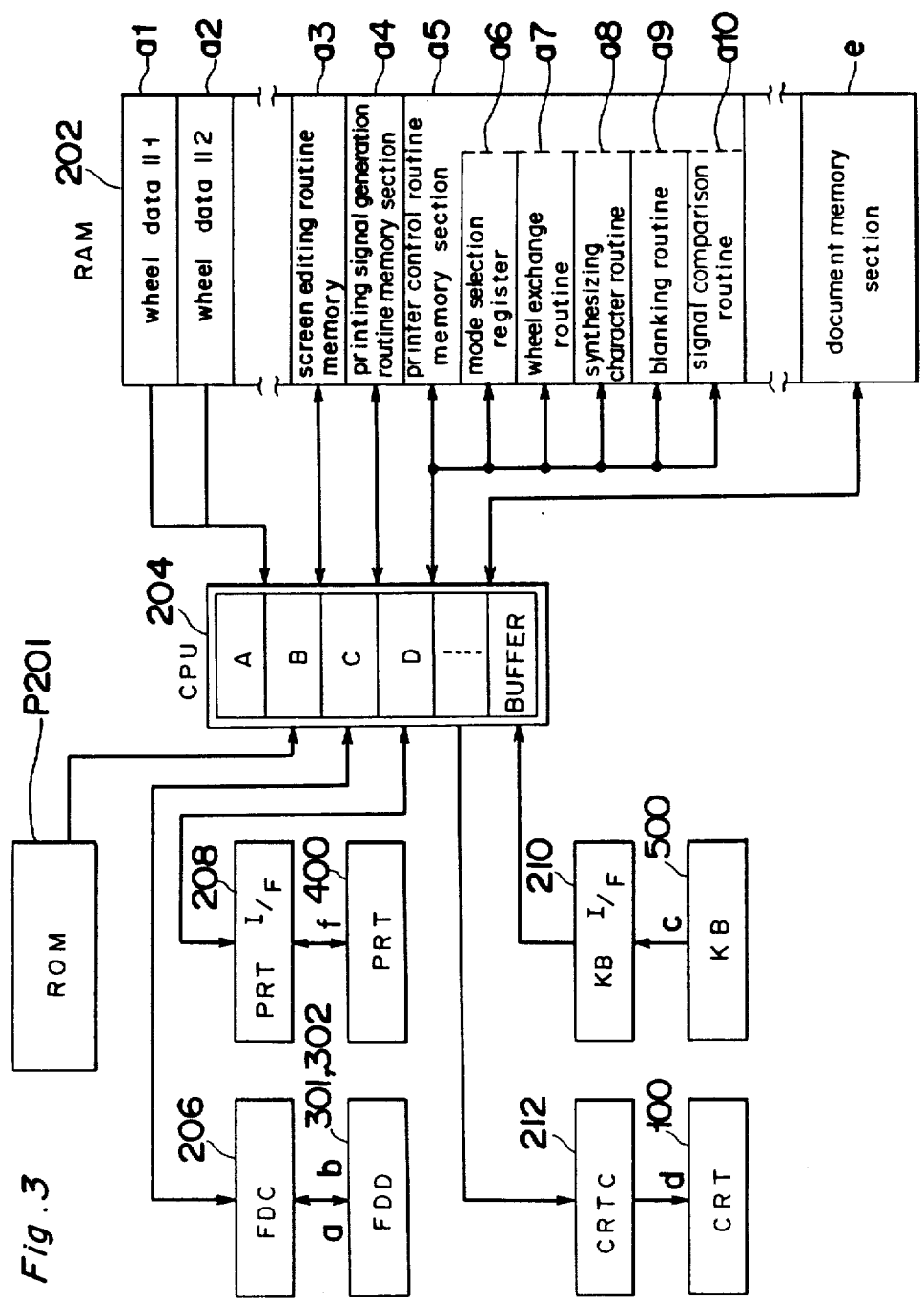
FIG. 3 is a block diagram showing the internal structure of the word processor.

Hereinafter, the structure of the host computer 200 with reference to FIG. 3 will be briefly described, together with explanation of the input and output of signals between the data on ROM/RAM memory 202 and a CPU 204.

The ROM/RAM 202 is a place for the temporary memory of depositing an edited text, format information, data such as LSR, LSM, CLS, prosecuting program and the like. (LSR is a register having a line-space information at present, CLS is a flag showing the presence of changing the amount of line gap between every line, and LSM is a range for installing the line gap information at every line.)

The CPU 204 is a so-called microcomputer which performs arithmetic processings. Since registers, input-output ports and the like and their respective functions are already well known, the description thereof will be abbreviated here. FDC 206 is a floppy disk controller for controlling inputs and outputs from and to the floppy disk drivers 301 and 302. PRTI/F208 is an input-output interface of signals between the CPU 204 and the PRT (printer) 400. Also, CRT controller (CRTC) 212 is an output interface to the CRT 100. Keyboard interface KBI/F210 is an input interface from the keyboard (KB) 500.

First, when the storage device 300 is switched on under the state that the system disk and the data disk are respectively installed into the floppy disk drivers 301 and 302, the CPU 204, in accordance with the contents of the program stored in the ROM 201, stores the contents of the system disk into the RAM 202 through the floppy disk controller 206. (Each block in the RAM 202 indicates only main contents relative to the present invention among the contents stored in the system disk.) An input signal c from the keyboard 500 is, through the keyboard interface 210, inputted to an A register of the CPU 204. Then, the CPU 204 carries out processings in accordance with the contents a3 in a screen editing routine memory section, while outputting a signal d to the CRT 100 through the CRT controller 212, and displaying on the screen 102 of the CRT. The input signal from the keyboard 500 is stored in sequence in a BUFFER In the CPU 204. When the BUFFER is filled with data, the contents of the data is moved to a text memory section e of the RAM 202.

Secondly, it will be described with respect to the case where the content of the document after completion of inputs, that is, after completion of the document, is outputted to the printer 400.

In order to print the completed document through the printer 400, a Print key 543 on the keyboard 500, which will be described later, should be depressed.

When a signal generated by the depression of this Print key 543 is inputted to the CPU 204 as an output c from the keyboard 500, the CPU 204 starts a printing signal generation routine in accordance with the content memorized by a memory section a4 of the printing signal generation routine on the RAM 202. Generally, signals existing in the word processor or the personal computer follow the ASCII code. For example, according to the ASCII code, "A" is represented by "41", and therefore, if "A" is pressed down through the keyboard 500, the content of the signal c outputted from the keyboard 500 is "41". Hereinafter, signals processed in the CPU, stored in the RAM 202 or outputted through the printer on the screen of the CRT will uniformly following the ASCII code.

In this printing signal generation routine, the content e of the document memory is sequentially read out to be outputted as a positional signal indicating the moving amount, moving direction or the like of the platen and a carriage, and as a character signal following the ASCII code. Although a memory section a5 of the printer control routine is included in the aforementioned memory section a4 of the printing signal generation routine by nature, particularly the section related to the present invention is indicated in a separate block as the memory section a5 of the printer control routine.

When the Print key 543 is depressed through the keyboard 500, the printing signal generation routine a4 is started in the CPU 204. On the screen 102 of the CRT, there are indicated, as will be described later in detail, a message for selecting one of the three printing modes for the printer 400 and a message for selecting a proper daisy wheel. The selection is performed by inputs through the keyboard 500. The data with respect to both the printing mode and the daisy wheel thus selected are stored in a mode selection register a6. A memory section a7 of a wheel exchange sub-routine, a memory section a8 of a character synthesizing sub-routine and a memory section a9 of a blanking sub-routine, which are formed as a part of the memory section a5 of the printer control routine together with the mode selection register a6, respectively store a sub-routine program for controlling the printing operation by the printer 400 in accordance with the selected mode. A memory section a10 of a signal comparison routine stores a sub-routine program which, through comparison between the content a1 or a2 of the wheel data #1 or #2 (such as the character, the number of spokes, the strength of the key touch, etc.) and the output a4 of the printing signal generation routine, discriminates in either one of which wheels #1 and #2 the character to be printed is included.

With respect to the order of signals, the contents of the memory section a4 of the printing signal generation routine is inputted, as a printing signal, into any one of the registers on the CPU 204. Then, either one of the wheel data #1 (a1) and #2 (a2) is inputted into a register different from the above one on the CPU 204 in accordance with the contents of the mode selection register a6. Thereafter, the contents of the memory section a10 of the signal comparison routine is inputted to the CPU 204, and following this program, the above-described wheel data a1 or a2 is compared with the printing signal (a4). As a result, if the wheel data a1 or a2 corresponds with the printing signal (a4), the data as it is is outputted to the printer 400 as a printing signal f, so that the printer 400 prints the character corresponding to the contents of the data. In the case where the printer 400 does not carry out the printing operation, the CPU 204 reads out, in accordance with the contents of the mode selection register a6, the contents of one of the sub-routines in the memory section a7 of the wheel exchange routine, the memory section a8 of the synthesizing character routine and the memory section a9 of the blanking routine, thereby practicing the read-out contents. Thereafter, the CPU 204 outputs the practiced contents as the printing signal f to the printer 400.

(c) Keyboard

Figure 4:
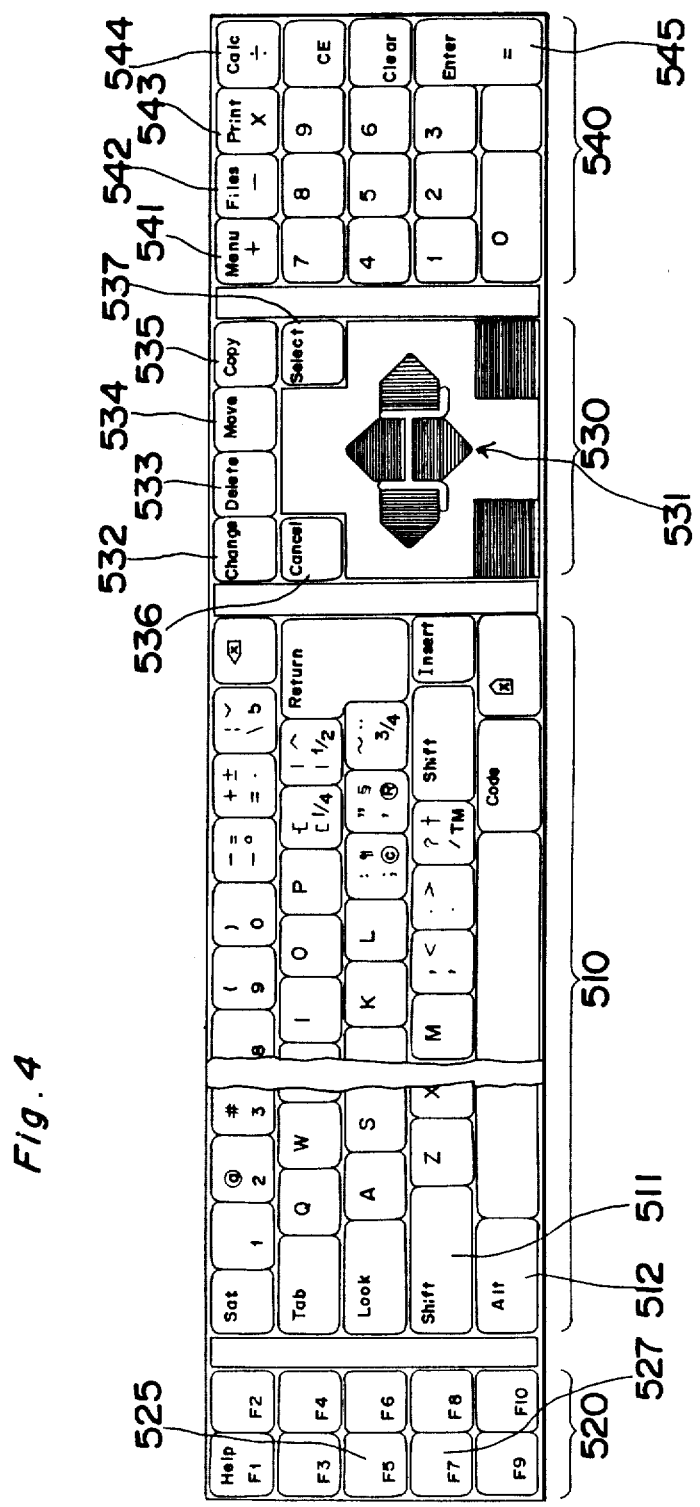
FIG. 4 is a plan view showing arrangement of keys of the keyboard.

The operation panel of the keyboard 500 will now be described in more detail with reference to FIG. 4.

In the present embodiment, two series of daisy wheels are prepared for the printer 400. However, the arrangement of the character keys 400 on the keyboard 500 has an important relationship with respect to the combination of characters in the two series.

Paying attention to character keys 510, alphabetical keys which are frequently used are assigned with only one character for each (however, actually, there are provided two characters, namely, a capital and a small letter are assigned for each key by a combined use with a shift key 511).

In the meantime, those keys which are relatively frequency used are allocated at the upper and lower left side in the character keys in combination with the shift key 511. The character keys centered at the right side are those which are considered to be less frequently used, and they are assigned with four characters for each key. The up-and-down exchange is made in combination with the Shift key 511, while the right-and-left exchange is carried out in combination with an Alt key 512.

In other words, for example, when a character at the upper right side is to be inputted, the operation of depressing the Alt key 512+Shift key 511+, the character key is performed.

As will be understood from the portions of the keyboard 500 where one key is assigned with four characters (FIG. 5), character keys disposed at the left side are mainly calculational characters such as +, −, =, [, }, etc., and those disposed at the right side are often used in the commercial field such as " © ", " ® ", " TM ", etc.

According to the present embodiment, two series of daisy wheels are employed in which alphabets and letters which are frequently used and assigned with only two characters for each key are made common. Specifically, one is a daisy wheel which contains characters disposed at the left side among the characters each four of which are assigned for one key, and another is a daisy wheel which contains characters disposed at the right side. (Hereinafter, the former will be indicated as #1 print wheel, and the latter will be referred to as #2 print wheel.)

The function of function keys 520 provided at the left end on the keyboard 500 will be described. The function of the keys can be changed in a desired one in accordance with a loaded program. In the case of the program for the word processor herein explained, for example, when a character is inputted after an F5 key 525 is depressed, the character appears to be of bold face when it is outputted or on the screen 102 of the CRT. On the other hand, when the character is inputted after an F7 character 527 is pressed, the character appears underlined. These functions are released by pushing the same keys again. Further, when an F9 key 529 is depressed, the conrents of the text prepared on the screen 102 of the CRT are filed on the data disk inserted into the floppy disk driver 302, thereby completing the program of the word processor.

Four keys 531 each formed in a pentagonal shape are provided at the central portion of the cursor moving keys 530, which are disposed slightly rightward from the center of the keyboard 500, so as to move the cursor 103 on the screen 102 of the CRT in a direction of its acute angles. Two keys of a square shape disposed below the above keys 531 on the keyboard move the cursor 103 fast. Above the keys 531 are formed six keys, four keys at the highest, that is, a Change 532, a Delete 533, a Move 534 and a Copy 535, being provided respectively for the purpose of sorting, erasing, moving and editing copies of the contents of the text prepared on the CRT screen. A portion to be edited is designated by the movement of the cursor 103. The Select key 537 is depressed in order to select the contents of a sub-menu or a menu among those displayed on the screen of the CRT by selection of a key such as a Menu key 541 or the like. A Cancel key 536 is used so as to cancel the manipulation of keys.

Four keys provided at the highest among ten keys 540 at the right side, namely, the Menu 541, Files 542, Print 543 and Calc 544 respectively function in the following manner upon simultaneous depression of the Shift key 511.

When the Menu key 541 is depressed, menus are displayed on the screen 102 of the CRT. When the Files key 542 is depressed, all of the data files stored in the data disk installed in the floppy disk driver 302 are displayed. Further, when the Print key 543 is depressed, the contents of the document now being displayed on the screen 102 of tne CRT is sent out as a printing command to the printer 400 from the host computer 200 of the storage device 300. Moreover, the depression of the Calc key 544 brings about the display of a calculator on the screen 102 without damaging the contents now being displayed on the screen 102, and therefore the printer of the present invention is able to be used as a calculator, independently in function from the word processor. The ten keys 540 are used as an input key in this case.

By way of example, when the necessity for calculation suddenly occurs during the preparation of the text on the screen 102, the Calc key 544 should be pressed down until the display on the screen 102 is changed to a calculator, when, for example, by pushing 8÷2= in succession, 8÷2=4 is displayed on the CRT screen 102. Although the ÷ key and the Calc key 544 are assigned on the same key, the Shift key 511 is not necessary to be pressed down even when the Calc key 544 is used. For returning to the original state, it is sufficient to press the Cancel key 536.

(d) Printing Flowchart

Figure 1B:
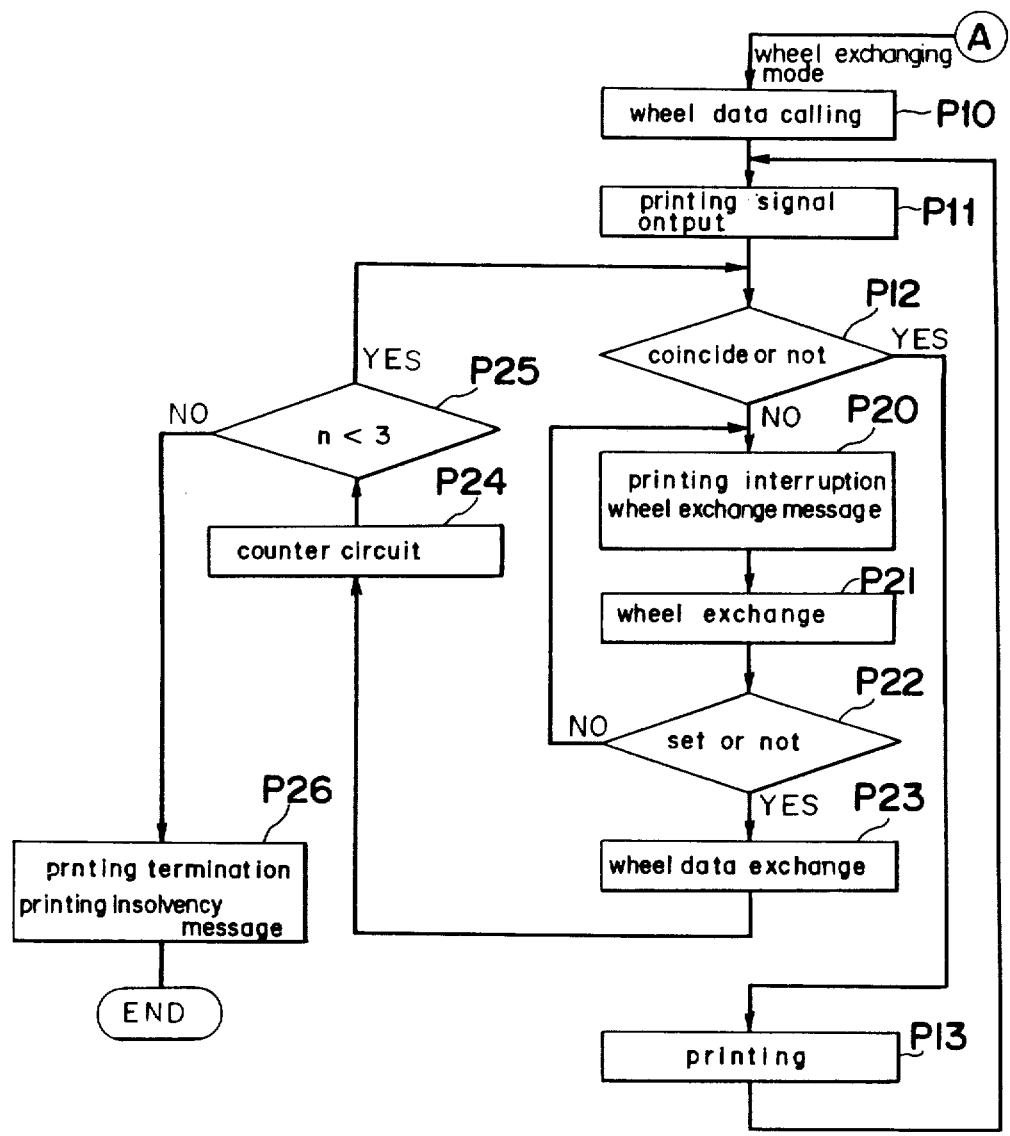

Now, the flowchart of the printing control routine stored in the memory section a5 of the printer control routine in RAM 202 will be described (FIGS. 1a and 1b).

Figure 14:
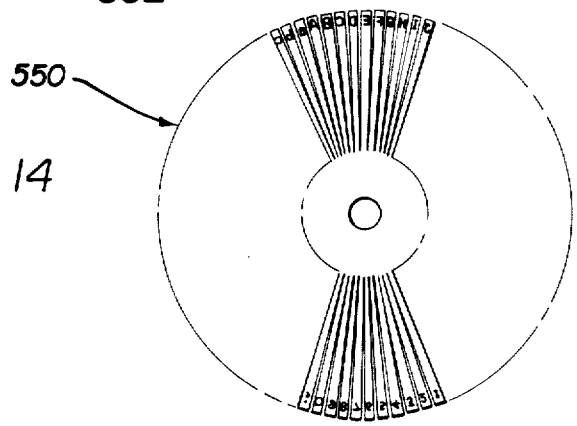
FIG. 14 schematically discloses a printing font.

At the start of the printing operation, first of all, a daisy wheel such as shown in FIG. 14 as element 550 is set in the printer 400 (step P1). Thereafter, a printing mode is selected (step P2). There are three printing modes, namely, a wheel exchange mode, a character synthesizing mode and a blank mode.

If the wheel exchange mode is selected, the flow moves to a signal comparison routing (a10). First the wheel data #1 or #2 of the selected daisy wheel stored in the RAM 202 is called up (step P10). Then, the data with respect to a character or characters to be printed is read out from a document memory section e (step P11). Through comparison between the data of the character read out in the foregoing manner and the wheel data, it is decided whether or not the character to be printed is included in the selected daisy wheel, in other words, the data of the character agrees with the wheel data (step P12). If the answer is "YES", the flow moves to step P13 where the printing operation is performed. After the printing operation is completed, the flow goes back to step P11, where the next character to be printed is processed.

In the case where the data of the character does not agree with the wheel data, the printing operation is interrupted so as to enter into the wheel exchange routine. First, a message for the wheel exchange is displayed on the screen 102 (step P20). At this time, an alarm is also generated. The user exchanges the daisy wheel in response to this alarm (step P21). Then, it is decided whether or not the daisy wheel is correctly set in the prmter (step P22). If the daisy wheel is not properly set in the printer 400, then the flow is returned to step P20 where the daisy wheel is again exchanged. On the other hand, if the daisy wheel is correctly set, the exchange of the wheel data is established (step P23). Then, a counrer is put to work (step P24), so that it is decided whether or not the calculated number is smaller than 3 (step P25). If it is smaller than 3, the flow is moved to step P12 where it is decided whether or not the character to be printed is included in the daisy wheel. If it is greater than 3, that is, if the daisy wheel has been exchanged over three times, the flow is terminated to display a message on the CRT screen 102 that the printing operation is impossible (step P26).

The case of the character synthesizing mode will now be described. When it is decided in the first signal comparison routines P10-P12 that the character to be printed is not included in the daisy wheel, the flow is entered into the character synthesizing routine a8. First of all, the synthesizing character routine is called up (step P31). Subsequently, by the use of the synthesizing character routine, signals are converted such that the character to be printed can be expressed by a character which is able to be printed (step P32). Then, the printing operation is carried out by using this converted data (step P13).

The case of a blank mode will be explained hereinbelow. When it is decided in the first signal comparison routine P10-P12 that the character to be printed is not included in the daisy wheel, the flow is entered into the blank routine a9. A blank process routine is called up first (step P41) so that the character to be printed is made in blank (step P42) to be printed in blank. In other words, actually the character to be printer is not printed (step P13).

As has been described thus far, in the word processor according to the present embodiment, it is possible to print all the characters which are able to be inputted through the keyboard by the daisy wheel printer. Moreover, the word processor of the present invention has such an advantage that, in correspondence with an intention of the user or the degree of emergency for the printing operation, a proper printing mode can be selected among the three printing modes: (1) printing accompanied with the exchange of the daisy wheel, (2) printing with one printing wheel by synthesizing characters to be printed and not included in the printing wheel and (3) skipping in blank without printing.

Further, in recent years, there have been developed such types of daisy wheel printers that can automatically exchange the wheel data after detecting the kind of the daisy wheel being set in the printer. Accordingly, if the word processor of the present invention is equipped with an automatic detection means for automatically detecting the kind of the daisy wheel as an output medium such that it is detected whether or not the daisy wheel is properly set in the printer or detached from the printer for an automatic wheel reset, the printing operation can be automatically started again only through the manipulation already referred to above upon completion of the exchange of the printing wheel, and therefore, the operation of the word processor is made easier, thereby effecting the advantage of the present invention.

Figure 1C:
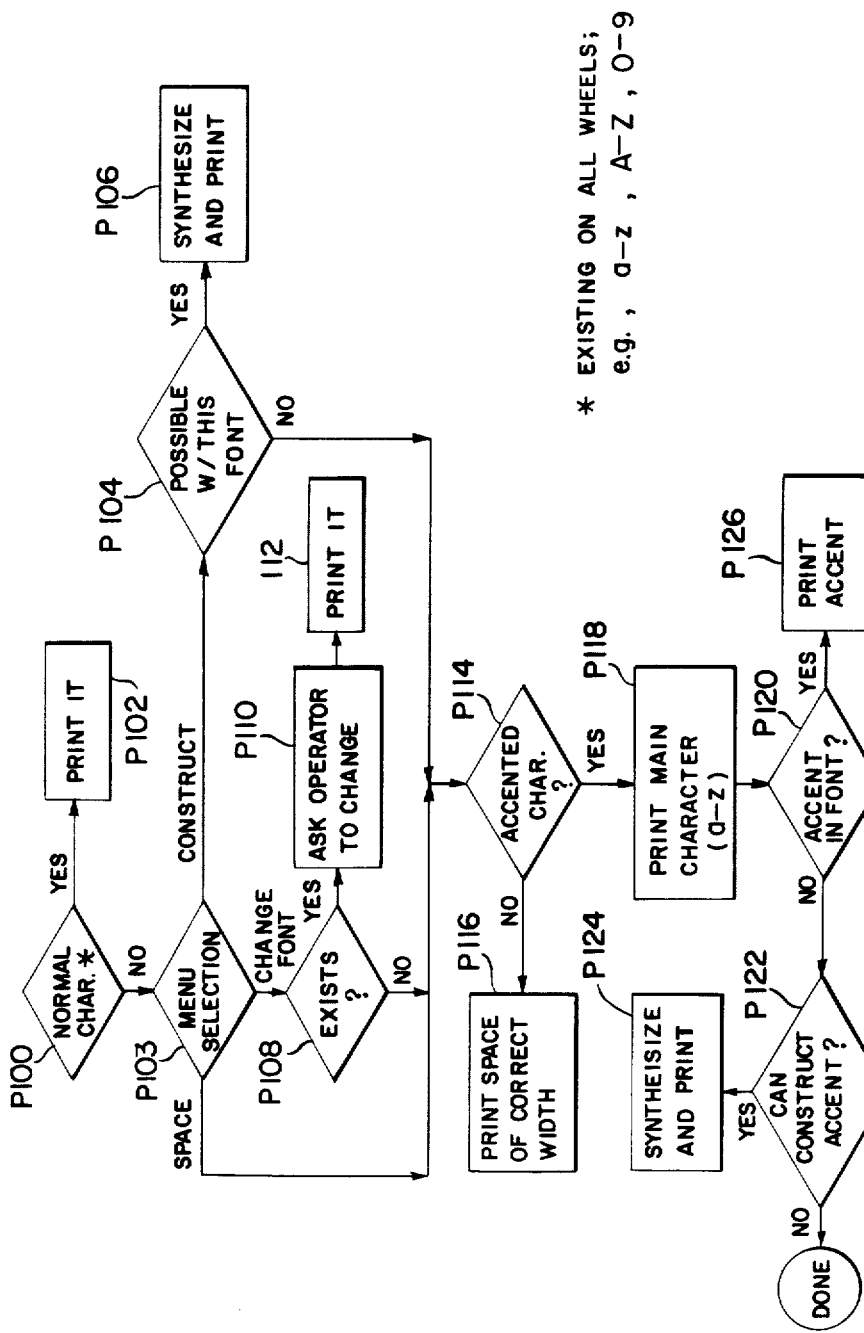
FIG. 1(c) provides the flow chart showing the process of the printing operation with the construction of accented characters.

The flowchart of FIG. 1(c) schematically illustrates in further detail the printing routine or strategy and includes a description of the construction of accented characters that was omitted from FIGS. 1(a) and 1(b) for purposes of brevity.

At step P100, a decision is made as to whether the printing signal output is for a normal character symbol, that is a symbol that is common to all printing fonts. If the answer is "YES", then the printer prints the symbol at step P102, if the answer is "NO", then the flow proceeds to step P103, to determine which printer mode of operation has been selected. If the SPACE mode has been selected, the program proceeds to step P114 to determine if an accented character symbol is to be provided. Obviously, the selection of a blank space negates any real decisional choice at step P114 and the printer responds to the command of providing a print space of correct width at step P116.

If the user had previously selected an exchange mode of printer operation at step P103, then the program proceeds to step P108 to determine if a print font having the desired symbol is available. As can be seen from FIG. 8, the operator on the PRINTER MENU had a choice of two different print wheels, however, it is possible to have more than two print wheels within the teaching of the present invention.

If the symbol exists on an available print wheel, then the screen 102 will display an appropriate message to the operator at step P110 to change the print font or wheel and after such a change the printer proceeds to print the symbol at step P112. When the symbol is not available on another printing font, then the program proceeds through step P114 with a negative response to the accented character decision and again provides a blank space at step P116 on the document.

Figure 8:
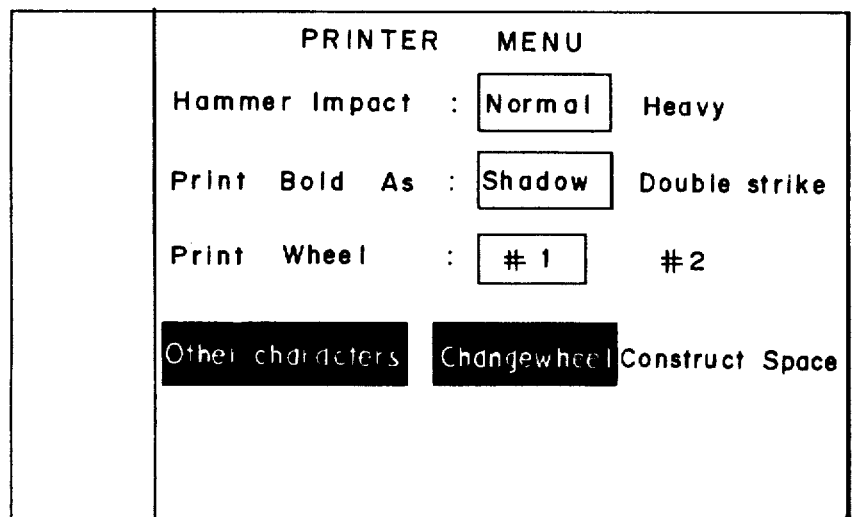
FIG. 8 is a front view of the screen of the CRT.

When the user selects a synthesizing mode of operation from the PRINT MENU of FIG. 8, the program will then proceed from step P103 to step P104 where a decision is made as to whether it is possible to synthesize the desired symbol from the printing font presently mounted on the printer. In this regard, the data as to which printing font is mounted on the printer has already been entered by the operator when he selected PRINT WHEEL #1 or #2. It can be readily understood that the printer could have the capability of determining which printing font is actually mounted on the printing carriage through an appropriate encoding and detection system. In either event, if at step P104 the answer is "YES", then the printer proceeds to synthesize and print the desired symbol at step P106. If the answer is "NO" at step P104, the program proceeds through the decision step of P114 to print a blank space of leave a blank space at step P116.

Figure 5:
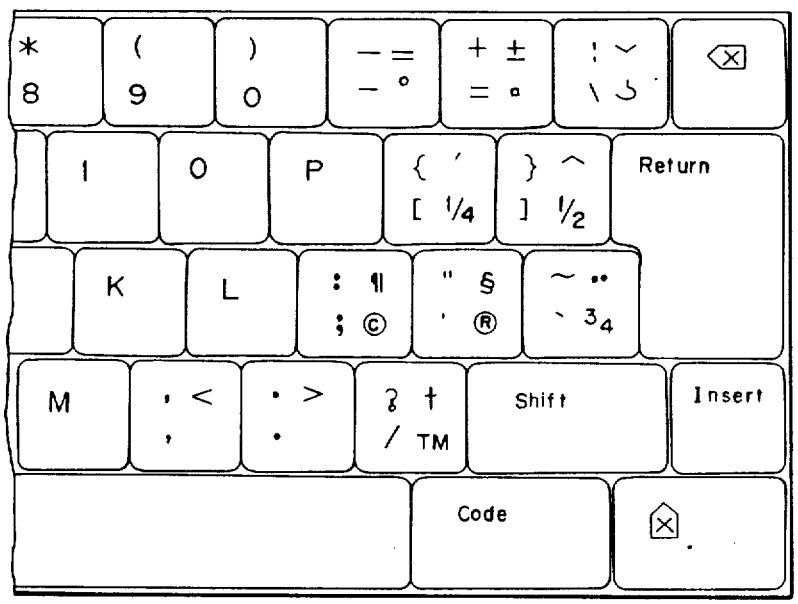
FIG. 5 is a plan view showing part of operation keys on an enlarged scale.
Figure 6:
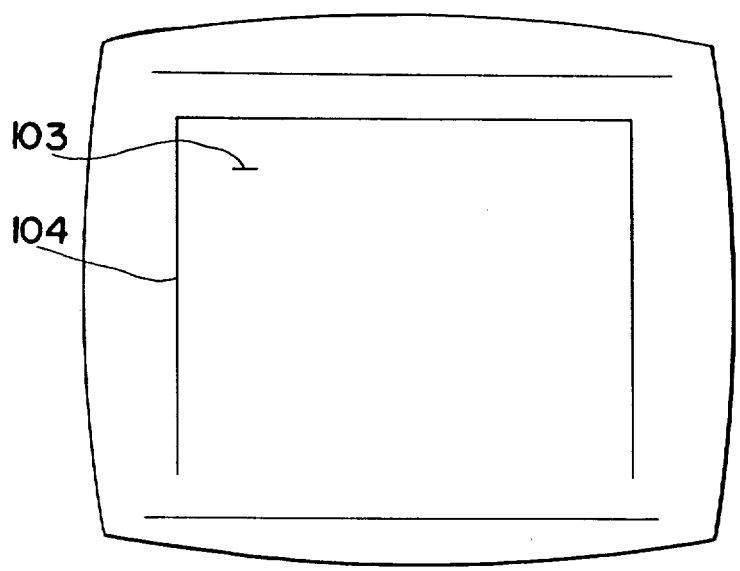
FIG. 6 is a front view of a CRT.

An operator can type an umlaut such as seen in FIG. 5 and a prompt on the display screen will provide a list of characters that can be combined as a single print command. However, such a compound accented character will not be available for example on the print fonts available in the United States and for the purpose of our program flowchart will not be recognized as a character that can be constructed at step P104.

If the desired symbol is an accented symbol, e.g. an umlaut character that is not available on the printing font, the decisional step P114 will respond with a "YES" answer and the character will first be printed at step P118 and then a decision will be made at step P120 as to whether the operative printing font has the ACCENT symbol if the answer is "YES", then the ACCENT symbol is printed at step P126. If the answer is "NO", then the program decides at step P122 whether the operative printing font can construct the ACCENT symbol, e.g. by positioning a period symbol and striking it twice above the character. If the answer is "YES" to the inquiry, then the ACCENT symbol is created at step P124, if the answer is "NO", then the printing operation of the desired symbol ceases and the routine is again repeated for the next symbol to be printed.

(e) Concrete Description of the Printing Operation

The manner of how to print characters by employing the function of each key on the keyboard 500 in the case where the characters to be printed are mixed ones with those includes in the printing wheel #1 and #2 will be described. For a definite example, the following equation $3\frac{1}{2} * [\frac{1}{4} \pm 5] = ?$ is to be printed. The characters "3", "*" and "5" are includes in the printing wheels #1 and #2. The characters "$\frac{1}{2}$", "$\frac{1}{4}$" and "$\pm$" are included only in the printing wheel #2, while the characters "[", "]", "=" and "?" are included only in the printing wheel #1. When 3, Alt+$\frac{1}{2}$, Shift+*, [, Alt+$\frac{1}{4}$, Alt+Shift+$\pm$, 5, ], =' Shift+? are input through the keyboard 500 in this order, $3\frac{1}{2}* [\frac{1}{4} \pm 5] = ?$ is displayed on the screen 102 of the CRT as is input.

Figure 7A:
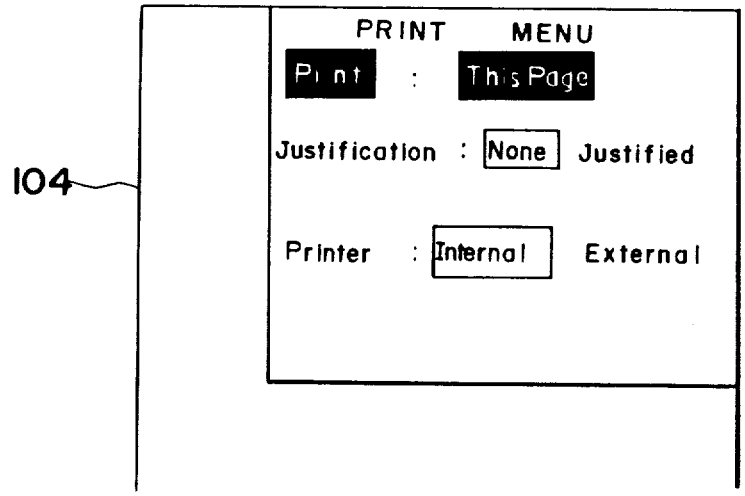
FIGS. 7(a) and 7(b) are front views of the screen of the CRT, respectively.
Figure 7B:
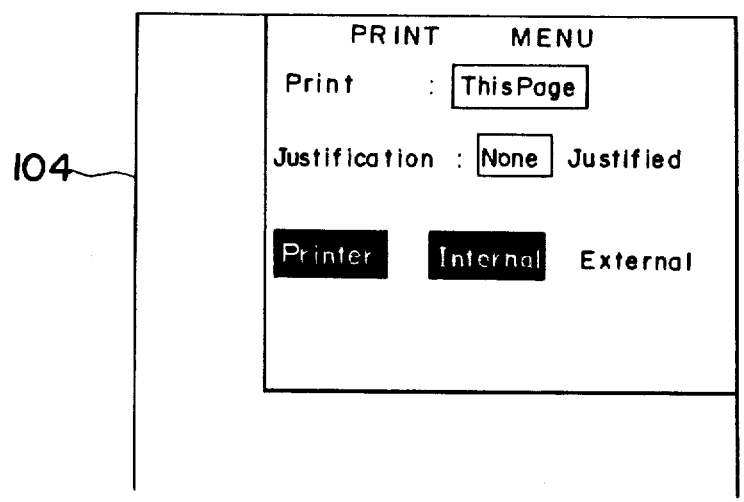

Then, when the Print key 543 among the ten keys 508 is depressed for printing the characters, a menu represented by PRINT MENU as shown in FIG. 7(A) is displayed on the screen 102. The portion where the cursor is now standing is surrounded by a black frame. At this time, when the key among the cursor moving keys 506 is depressed twice, the portions indicating Printer and Internal thereon are changed to be white in black (FIG. 7(b)). It is to be noted here that Internal is automatically set if an external printer is not connected. Then, when the select key 537 is pressed, the screen 102 changes to display a sub-menu shown in FIG. 8 (displayed as PRINTER MENU). This sub-menu enables the selection of a hammer impact between Heavy/Normal and a bold face between Shadow/Doublestrike. In addition, it is a characteristic advantage of the present embodiment that a printing wheel to be set first in the printer 400 can be designated among the two series of the daisy wheels #1 and #2. It is needless to say that it is an important characteristic of the present invention to be able to select one of the three modes (the wheel exchange mode, the character synthesizing mode and the blank mode) (step P2) in the case where the wheel data in each of the printing wheels #1 and #2, by comparing the printing command stored in the ROM of the host computer of the storage device 300 or in the system diskette installed in the floppy disk driver 301, with the wheel data in the designated printing wheel, finds out that the character to be printed is not included in the printing wheel being set in the printer at that time. The manner for the selection is the same as is described with respect to PRINT MENU.

More specifically, it will be described with respect to the case where the wheel exchange mode is selected. The cursor is moved to the position of the Change wheel. At this time, both Other character and Change wheel are changed into white characters in black. Then, the Select key 537 is pressed down. In the case where the word processor is initially subjected to the other two modes than the wheel exchange mode, the portion of Change wheel is surrounded by a black frame, with the remaining portion being faded with the black frame. Since the portion surrounded by the black frame is overlapped with the portion of white characters in black, actually the black frame is not observed.

Next, the Enter key 545 of the ten keys 508 is pressed. The Enter key 545 is an operational key, which is turned onto change the screen 102 of the CRT to display the preceding PRINT MENU. (If the Cancel key 536 is pressed, the CRT screen 102 is returned without operation.) When the Enter key 545 is further pressed, the menu disappears from the CRT screen 102, and the initial display $3\frac{1}{2}*[\frac{1}{4} \pm 5] = ?$ to be printed comes on the screen 102. Thereafter, the wheel data of the printing wheel #1 is called up (step P10) to output the first character "3" as a printing signal output. Since "3" is included in the printing wheel #1 (step P12), the character "3" is printed (step P13). Then, the flow returns to step P11.

Then, as a next printing signal, the second character "$\frac{1}{2}$" is called up (step P11). After it is decided that "$\frac{1}{2}$" is not including in the printing wheel #1 (step P12), the printing operation is interrupted.

At this time, at the lower part of the screen 102 of the CRT, there appears a message which reads "Change #1 Print Wheel and Press Enter" (step P20). And, the silent cover 407 of the printer 400 is opened so as to ascertain the kind of printing wheel now being set in the printer 400. If the printing wheel now be set in the printer 400 is not the printing wheel #1, the wheel is exchanged with the printing wheel #1, and the silent cover 407 is closed. The movement for closing the silent cover 407 brings the printing wheel #1 subjected to resetting. When the printing wheel is to be exchanged, this wheel resetting must always be done. Otherwise, since the printing wheel is not properly set in the printer 400, quite a different character from the character to be printed is printed. After the printing wheel has been completely set in the printer in the manner as described above (step P21), upon pressing the Enter key 545, there appears a message on the lower part of the CRT screen 102 which reads "Load 8½"×11" Paper Close the Bail Lever and press Enter", if the printing wheel is correctly set in the printer. A paper is inserted from the slantwise direction along the paper guide 402 until it reaches approximately at the portion of a printer engine (not shown). Then, the bail lever 450 is inclined forward and the paper is automatically set in the printer. After completion of insertion of the paper, the bail lever is returned to its original position. It is to be noted here that the position decision guide 405 can be set at any desired position by the user as a guide in a horizontal direction at the insertion of papers.

The operation for printing "½" is started at last by depressing the Enter key 545. The wheel data is exchanged with the wheel data #2 (step P23). If it is ascertained that "½" is included in the printing wheel #2 (step P12), the printing operation is carried out (step P13).

The third character "*" is outputted in the form of a printing signal output (step P11). After it is ascertained that "*" is included in the printing wheel #2 (step P12), the character "*" is printed (step P13).

Next, the fourth character "[" is outputted in the form of a printing signal output (step P11). Since "[" is not included in the printing wheel #2 (step P12), the printing operation is interrupted in the same manner as for the second character, with a message being displayed on the lower part of the CRT screen 102 which reads "Change Print Wheel and Press Enter".

The printing operation will be performed hereinafter in the same manner as above with the alternate exchange between the printing wheels #1 and #2.

The embodiment herein described is employed from the intention to increase opportunities for the exchange between the printing wheels #1 and #2. However, in practical use, possibilities requiring the exchange of the printing wheels are relatively small. Moreover, the printing operation is performed with beautiful characters which are regularly designed. Therefore, this function of the wheel exchange mode plays a great role on the effectiveness of the word processor of the present invention. It is a demerit, however, that the user should stand by the word processor all the time during the printing operation.

Hereinafter, the case where the synthesizing character mode is selected will be described. The procedure for setting the printing wheel and the papers is the same as in the case where the wheel exchange mode is selected. Although characters "3", "*", "[", "5", "=" and "?" are including in the printing wheel #1, "½", "¼" and "±" are not included in the printing wheel #1. In the synthesizing character mode, the latter characters are printed by the use of the printing wheel #1. More specifically, when "½" or "¼" is to be printed, the paper is fed in a reverse direction to the superscript position where "1" is printed, and then the paper is returned to a slightly rightward position than the original printing position (for example, by 6/120 inch) where "/" is printed. The paper is further moved rightward by the same amount as above to be fed in the right direction, and thereafter "2" or "4" is printed at the subscript position. In the case of printing "±", the paper is fed slightly in the reverse direction (for example, by 2/48 inch) to be printed with "+", and then the paper is fed in the right direction at the same position as above (for example, 2/48 inch) to be printed with "—". (It is to be noted that, according to the arrangement of characters shown in FIG. 3, characters included only in the printing wheel #1 cannot be synthesized by the printing wheel #2).

With respect to the printing operation, if it is ascertained in step P12 that the printing signal output is included in the printing wheel #1, then the character is immediately printed in step P13. On the other hand, if it is decided that the printing signal output is not included in the printing wheel #1, the synthesizing character routine is called up (step P31). Accordingly, the output is changed into a synthesizing character (step P32), thereby generating a printing signal (step P13).

It is advantageous to select the synthesizing character mode since the printing wheel is nor necessary to be exchanged each time the necessity occurs, therefore enabling the user to be away from the printer during the printing operation. However, this mode is disadvantageous in that the characters are not uniform in size, nor does the shape thereof seem natural.

Finally, the case where the blank mode is selected will be described. The setting of the direction of printing and papers, and the other operation procedures are the same as in the case where the wheel exchange mode is selected. According to this blank mode, characters not included in the printing wheel set in the printer are skipped so as to remain blank (space) (steps P41–P42). This mode is often selected in the case where the printing speed is most required. The blanked portions must be supplemented with proper characters by hand later.

According to the present invention, the description has been made with respect to the case where two series of daisy wheels are employed. It is needless to say, however, that the word processor may be so arranged as to be able to select among three printing modes even when more than three series of daisy wheels are prepared.

(f) Change in Line Interval

Figure 9:
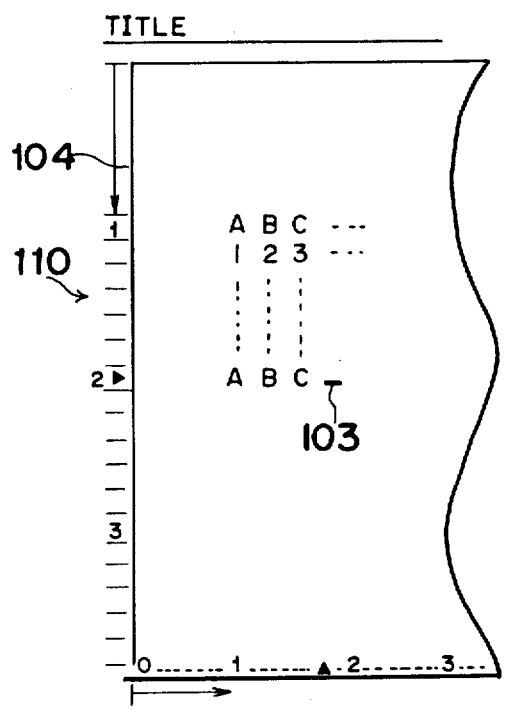
FIGS. 9 and 10 are front view each showing another image on the screen of the CRT.
Figure 10:
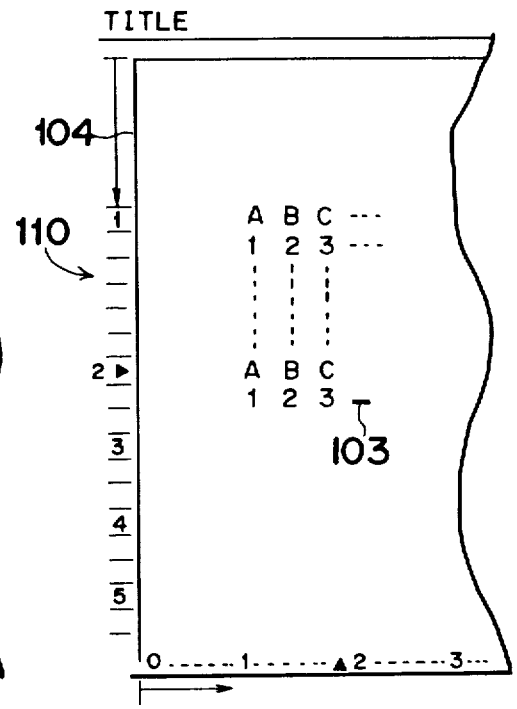

One of the characteristic features displayed by the word processor according to the present embodiment resides in a fact that a document can be prepared on the screen with full use thereof even in the case where the interval between lines is changed in the midst of the preparation of the document. When the document is prepared by the word processor of the present invention, as shown in FIG. 9, a typing scale 110 with inch division is displayed in a longitudinal direction at the left side of the frame 104. Numerals on the typing scale 110 represent the distance to be disposed from the upper end of the frame 104 by inch units. It is to be noted that, in FIG. 9, the document is inputted by a single space. Meanwhile, when the interval between lines is changed in the midst of the document, the practical interval between the lines is not displayed on the screen in the present embodiment, but is indicated by changing the typing scale in a longitudinal direction. Accordingly, the screen on the given display 102 of specific dimension can be utilized in full scale. Moreover, it can be instantly recognized from the numeral to be disposed on the typing scale 110 which part of the document is now being prepared, thereby increasing the efficiency of document preparation. For example, when the document to be disposed on and after two inches from the upper end of the frame 104 is inputted by double space on the screen shown in FIG. 9, the screen becomes the one as shown in FIG. 10 (it is easily recognized from the numeral on the typing scale 110 the fact that the document is inputted by double space).

Figure 11:
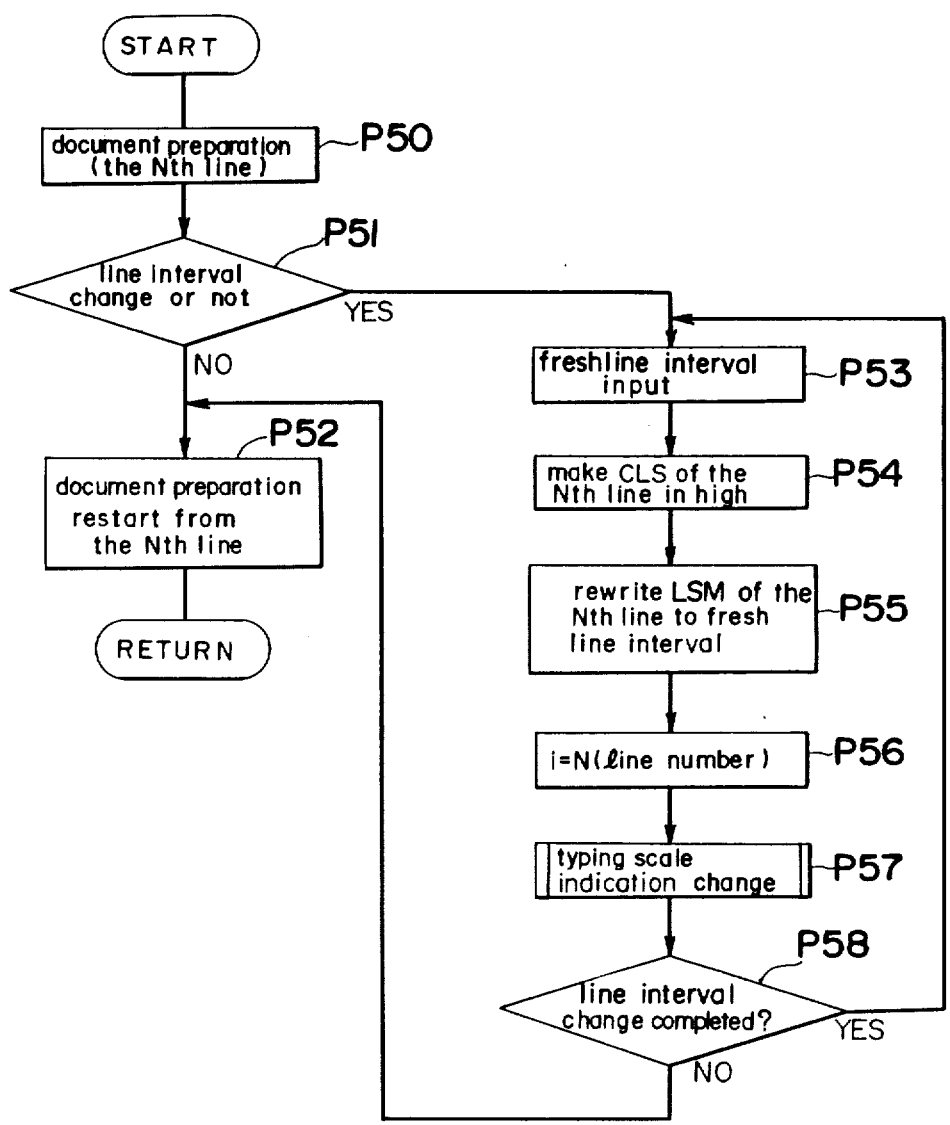
FIG. 11 is the flow chart for inputting changes of the line interval.
Figure 12:
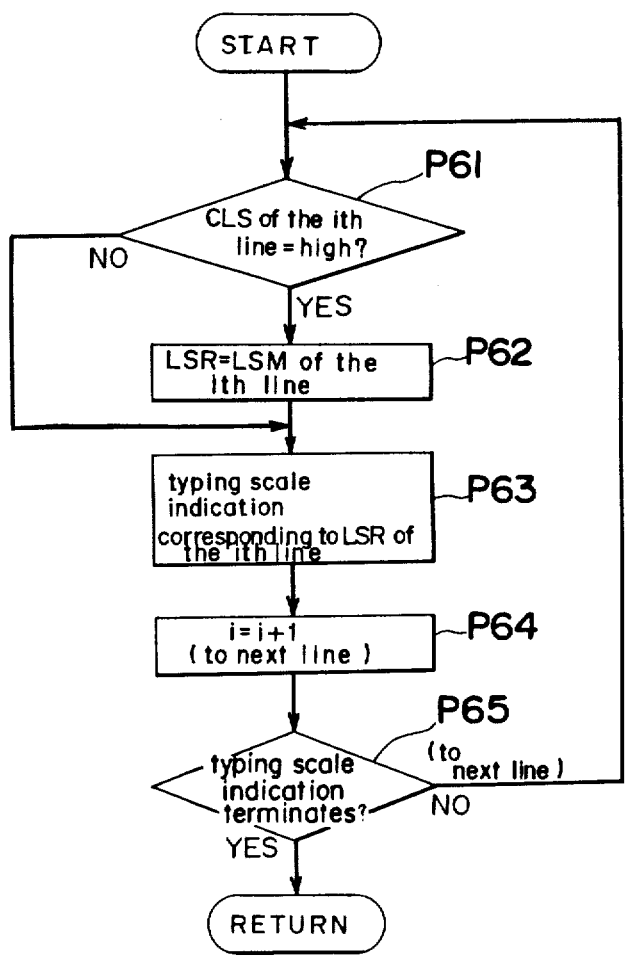
FIG. 12 is the flow chart for determining the existence of changes of the line interval.

The process for changing the intervals between lines in the intervention of inputting the document is carried out in accordance with flow charts shown in FIGS. 11 and 12. At the time that the N-th line of the document is prepared (step P50), it is discriminated whether or not a line interval changing key 526 is pressed (step P51). In the case that the key is not pressed down, the flow proceeds to step P52 to start the preparation of the document again.

When the change of the line interval is required by inputs through the key 526, a fresh line interval is inputted at first (step P53). According to the present embodiment, the line interval can be selected among single space (6 lines/inch), 1¼ space, 1½ space, double space and triple space. The designation of the line interval is effected by pressing a key allotted with each one number from 1 to 5 corresponding to the above single space, 1¼ space, 1½ space, double space and triple space, thereby to appoint the kind of line intervals. Then, a Select key 537 is pressed to complete the designation of line interval. A flag CLS showing the line interval change of the N-th line is shifted into high level (step P54) to being a line interval information memory LSM of the N-th line to be rewritten with the fresh line interval calculated by the LSC (step P55). After the equation i=N is established (step P56), the typing scale 110 is changed in response to the fresh line interval as will be described later (step P57). Then, it is discriminated whether or not the change of line interval is completed (step P58). In addition, if and when a further change of the line interval is necessary, the flow should be returned back to step P53 to input the fresh line interval. Upon completion of the line interval change, the flow proceeds to step P52 to restart the preparation of the document from the N-th line.

The indication of the typing scale 110 is performed by a sub-routine shown in FIG. 12. At first, it is discriminated whether or not the line interval of the i-th line is changed (step P61). When the change in the line interval is actually effected on the i-th line, the line interval information of the i-th line in the memory LSM is transferred to a line interval storing register LSR. Next, a typing scale 110 corresponding to the line interval information stored in the register LSR is indicated (step P63). Thereafter, number i is added by one (step P64), and it is discriminated whether or not the change of the indication by the typing scale 110 is completed. If the change in the indication with the typing scale 110 is not completed, the flow returns back to step P61 to change the indication of the typing scale with respect to the next line. When the indication of the typing scale is changed until the last line of the text, the flow is completed and goes to RETURN.

(g) Stop Code at the Last Printing Character

Another feature of the word processor according to the present embodiment resides in a fact that the printing operation of the document by the stop code can be carried out efficiently. In the case that only a part (for instance, a date) of the document (such as slip) is to be changed, it is enough to input the subject part only if employing the stop code. However, in the conventional word processor, for instance, when a stop code is registered at the position of date in order to input a date in the slip later, the stop code once registered is always adapted to stop the printing operation at the position of the date even when it is necessary to print the same date on many slips during even one day.

Accordingly, the word processor of the present embodiment has its characteristic feature in this point, that is, the word processor can make the decision as to whether or not the printer should be stopped during the printing operation in correspondence with the stop code having been registered at the time of registering the document. At the time that the document is registered, a stop code is moved by the cursor moving key to the position where the stop code is desired to be registered, and then, a stop code registration key 522 is adapted to be pressed. By this pressing operation, a stop code symbol is displayed on the screen. Before starting the printing operation of the document, the decision as to whether the stop code flag is on or off is made. When the printing operation is to be interrupted by the stop code during the printing operation of the document, a stop code flag-on key 523 is adapted to be pressed. In this state of depressing the key, the printing operation of the document is carried out in succession.

Figure 13:
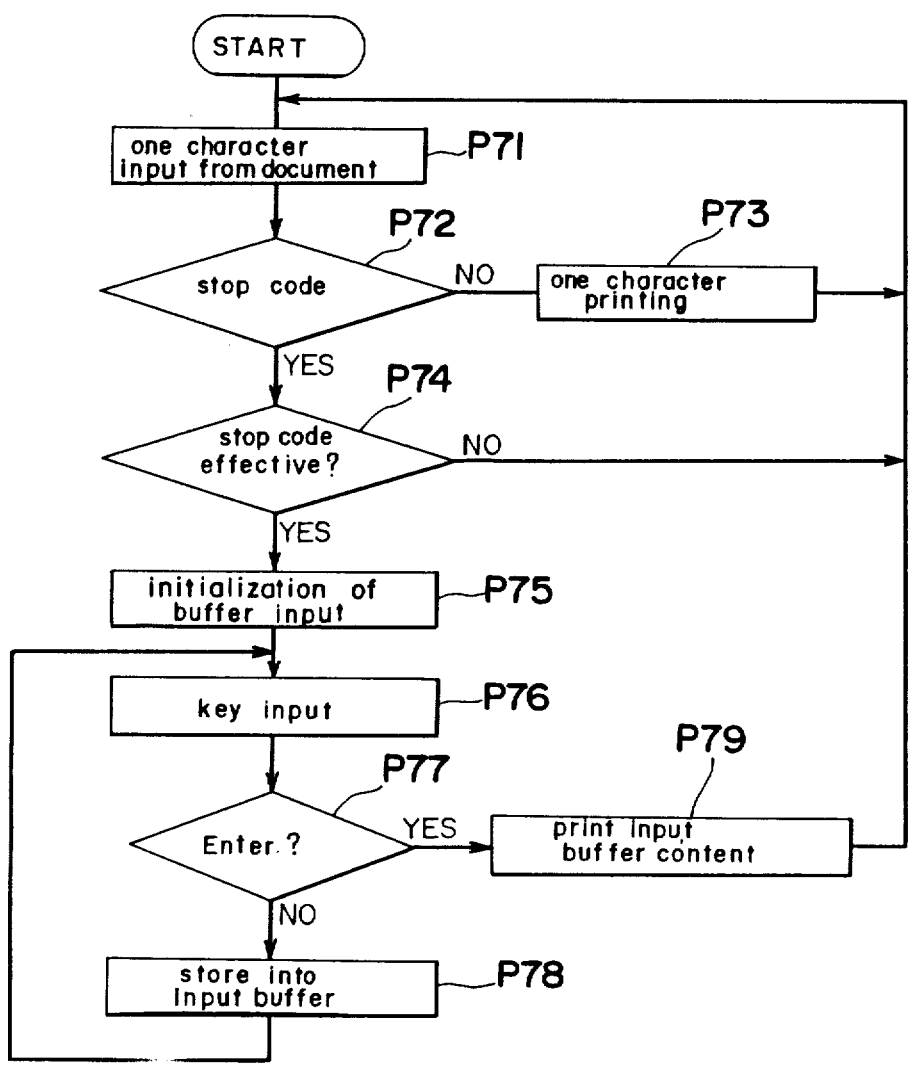
FIG. 13 is a flow chart showing a process of stop code.

The process for the stop code at the time of the printing operation is performed in accordance with the flow chart of FIG. 13. When one character among the document file stored in the diskette is inputted for printing the document (step P71), the discrimination is made about whether or not the input of the one character is a stop code (step P72). If the input is not a stop code, the one character is printed (step P73), and the flow is returned back to step P71. On the other hand, if the input is a stop code, the printing operation is interrupted to wait for the input of a key. Then, it is discriminated whether or not the key input is an Enter key 545 (step P74). If the key input is the Enter key 545, the flow goes back to step P71. But, if the key input is not the Enter key 545, the stop code is activated to move the key input to an input buffer until the Enter key 545 is inputted. In other words, the stop code is adapted to initialize the input buffer at first (step P75), and to perform the key input (step P76). Then, after discriminating whether or not the key input is the Enter key input (step P77), if the key input is not the Enter key input, the key input is stored in the input buffer, and the next key input is carried out (step P76). On the contrary, if the key input is the Enter key 545, the stop code is rendered to be invalid, and the content stored in the input buffer is adapted to print (step P13) to return back to step P71.

In the printing operation of the document, if the printing operation is to be continued without interruption by the stop code, a stop code flag-off key 524 is depressed. When the printing operation of the document is actuated under this state of pressing the key 524, the printing operation is rendered to continue even though the stop code is inputted.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A printing system for a word processor mode of operation comprising:

a display screen;

a keyboard for inputting characters to be printed onto the display screen;

a document memory for storing data content representative of the inputted characters from the keyboard;

a printer having at least a pair of exchangeable printing fonts with a plurality of different printing symbols relative to each other;

means for controlling the printing of a symbol by the printer from the stored data including data memory means for storing a list of character symbols on each printing font and determining means for comparing the stored inputted character with the stored list of characters to determine the availability of a character on a font;

exchange means for stopping the printing operation and indicating the necessity to exchange the printing font with another printing font having the desired symbol when the determining means indicates a symbol is not on the operative printing font;

synthesizing means for synthesizing the symbol that is not available on the operative printing font from a combination of other symbols that are available on the printing font when the determining means indicates a symbol is not on the operative printing font;

spacing means for having the printer automatically provide a blank space when a symbol is not available on the printing font, thereby permitting the printer to continue the printing operation with the symbols available on the operative printing font;

means for displaying a selection menu to the user on the display screen to select by appropriate entry form the keyboard between the exchange means mode of printer operation, the synthesizing means mode of printer operation, and the spacing means mode of printer operation whereby the printer will respond automatically in the mode selected when a symbol is not available on the operative printing font, and means for automatically providing a blank space when the synthesizing means has been selected and the symbol cannot be synthesized from a comparison of the data representative of the character and the stored data of the list of character symbols on the operative printing font.

2. The invention of claim 1 further including means for indicating, on the display screen, that a printing operation is impossible with the available printing fonts.

3. The invention of claim 1 further including means for automatically displaying on the display screen a requirement to exchange printing fonts.

4. A printing system for a word processor mode of operation comprising:

a display screen;

a keyboard for inputting characters to be printed onto the display screen;

a document memory for storing data content representative of the inputted characters from the keyboard;

a printer having at least a pair of exchangeable printing fonts with a plurality of different printing symbols relative to each other;

means for controlling the printing of a symbol by the printer from the stored data including data memory means for storing a list of character symbols on each printing font and determining means for comparing the stored inputted character with the stored list of characters to determine the availability of a character on a font;

exchange means for stopping the printing operation and indicating the necessity to exchange the printing font with another printing font having the desired symbol when the determining means indicates a symbol is not on the operative printing font;

synthesizing means for synthesizing the symbol that is not available on the operative printing font from a combination of other symbols that are available on the printing font when the determining means indicates a symbol is not on the operative printing font;

spacing means for having the printer automatically provide a blank space when a symbol is not available on the printing font thereby permitting the printer to continue the printing operation with the symbols available on the operative printing font;

means for selecting by appropriate entry from the keyboard the exchange means mode of printer operation, the synthesizing means mode of printer operation, and the spacing means mode of printer operation, whereby the printer will respond automatically in the mode selected when a symbol is not available on the operative printing font, and means for automatically providing a blank space when the synthesizing means has been selected and the symbol cannot be synthesized from a comparison of the data representative of the character and the stored data of the list of character symbols on the operative printing font.

* * * * *